No. 758,081. PATENTED APR. 26, 1904.
E. KOTTUSCH.
BELT SHIPPER FOR PULLEYS.
APPLICATION FILED JULY 29, 1903.
NO MODEL. 3 SHEETS—SHEET 1.

WITNESSES
A. W. White
John A. Perceval

INVENTOR
Emanuel Kottusch
By Richards
ATTORNEYS

No. 758,081. PATENTED APR. 26, 1904.
E. KOTTUSCH.
BELT SHIPPER FOR PULLEYS.
APPLICATION FILED JULY 29, 1903.
NO MODEL. 3 SHEETS—SHEET 2.

WITNESSES
INVENTOR
Emanuel Kottusch
By
ATTORNEYS

No. 758,081. PATENTED APR. 26, 1904.
E. KOTTUSCH.
BELT SHIPPER FOR PULLEYS.
APPLICATION FILED JULY 29, 1903.
NO MODEL. 3 SHEETS—SHEET 3.

WITNESSES
INVENTOR

No. 758,081. Patented April 26, 1904.

UNITED STATES PATENT OFFICE.

EMANUEL KOTTUSCH, OF ZURICH, SWITZERLAND, ASSIGNOR TO FRITZ HOLZACH, OF ZURICH, SWITZERLAND.

BELT-SHIPPER FOR PULLEYS.

SPECIFICATION forming part of Letters Patent No. 758,081, dated April 26, 1904.

Application filed July 29, 1903. Serial No. 167,478. (No model.)

*To all whom it may concern:*

Be it known that I, EMANUEL KOTTUSCH, mechanic, a citizen of the Republic of Switzerland, residing at Schönthalstrasse 19, Zurich, Switzerland, have invented new and useful Improvements in Belt-Shippers for Pulleys, of which the following is a clear and exact specification.

My invention relates to a belt-shipper for pulleys the distinguishing feature of which is that there is fitted beside the pulley and on its shaft in such a manner as to admit of its being revolved a segment of angle-shaped cross-section the angular surface or area of which, running concentric with the pulley-rim, forms a tapered cylindrical surface, so that on the segment being turned round the belt is shipped onto the pulley by the upright flange or edge, which is set obliquely in a manner corresponding with the tapered shape of the concentric segment-surface. This belt-shipper has or may have the further distinguishing feature that the segment is made in two parts and that both parts may be radially adjustable, so that the same shipper may be made to fit within certain limits pulleys of different diameter.

The improved belt-shipper is illustrated in the accompanying drawings, in which—

Figure 1:
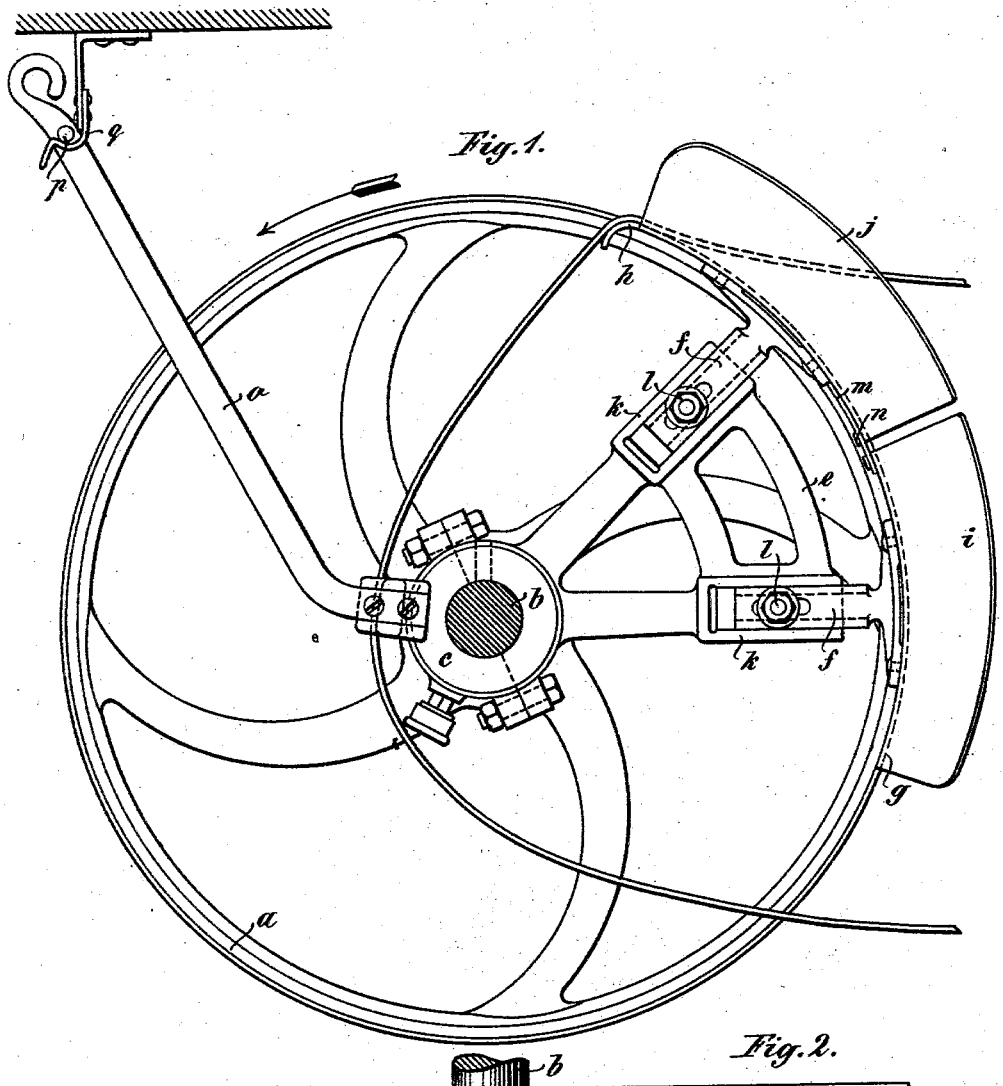
Figure 2:
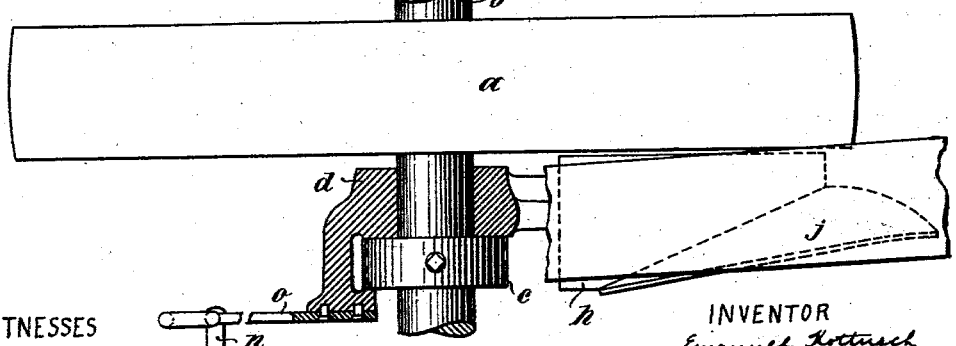
Figure 3:
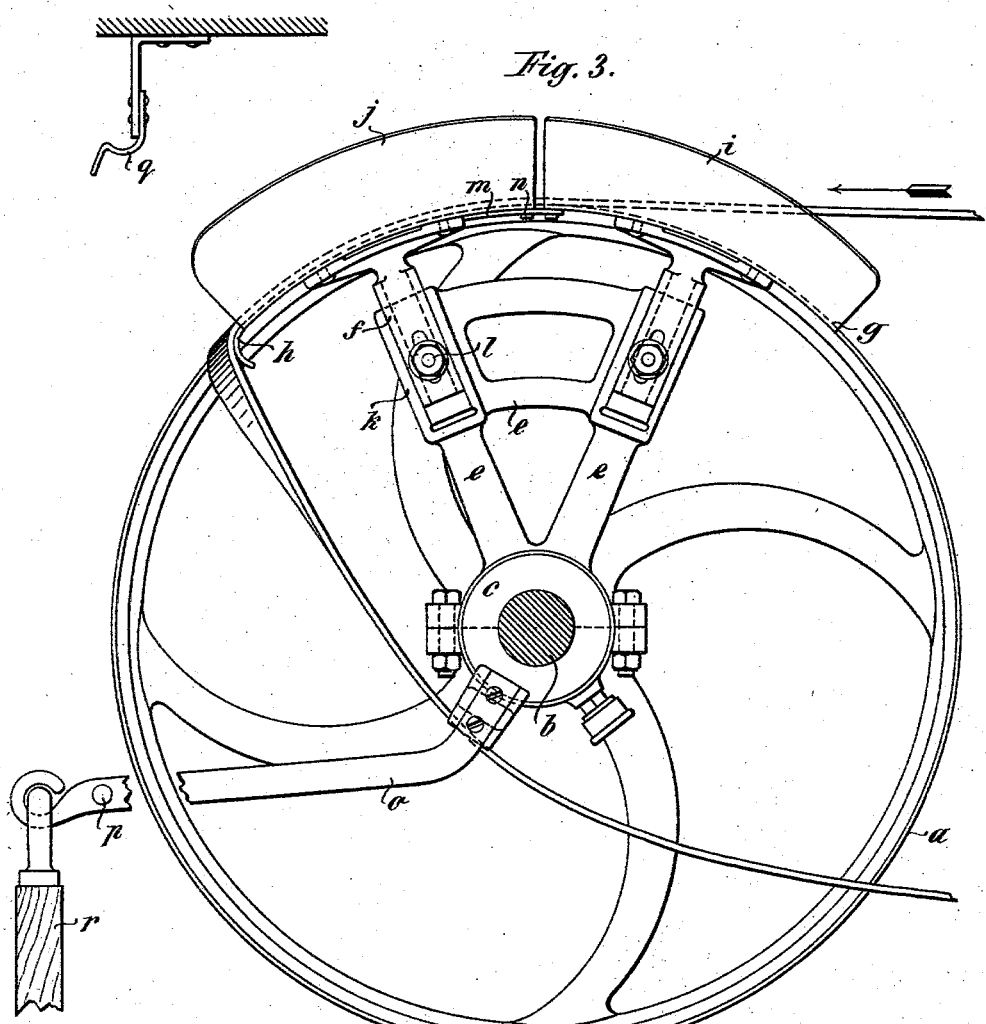
Figure 4:
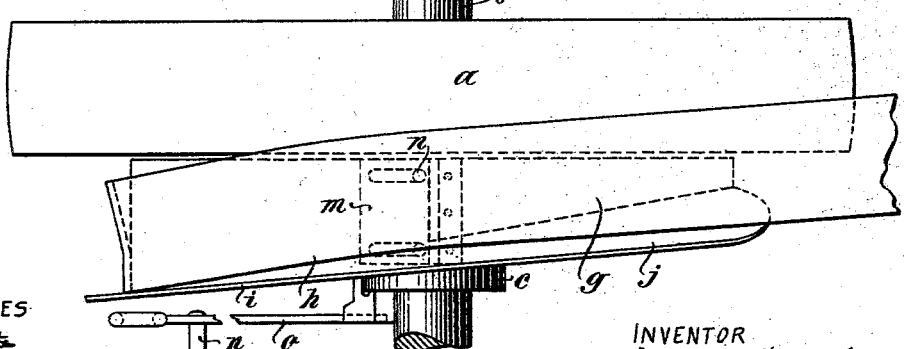
Figure 5:
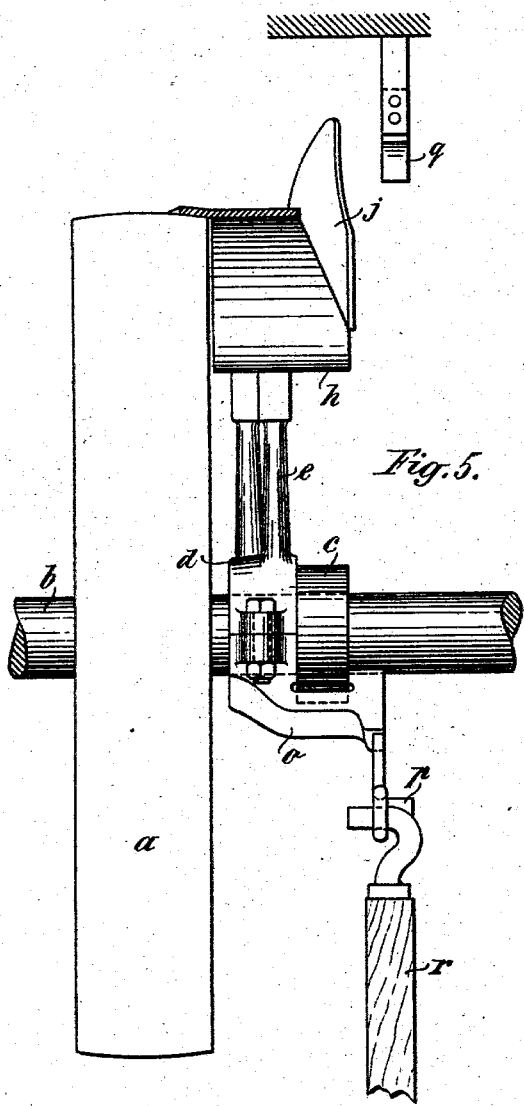

Figure 1 is a side view of the pulley and of the shipper, showing the belt unshipped; Fig. 2 in partial section a top view of the parts shown in Fig. 1; Fig. 3, a side view of the parts in position while the belt is shipped; Fig. 4, a top view of the parts shown in Fig. 3; Fig. 5, an end view of the parts shown in Fig. 3.

The belt-shipping segment $e$ is arranged on the shaft just beside the pulley $a$, and its nave $d$ is prevented from shifting laterally on the shaft $b$ by means of an adjustable collar $c$. The shipping-surface is immediately beside the pulley-rim and consists of two curved portions $g\ h$, provided with flanges $i\ j$. The supporting-arms $f$ of the two portions may be radially shifted in guides $k$ and be fixed by set-screws $l$. To avoid creating a free space between the surface parts when shifting the portions outward, one of the portions—for instance, the part $g$—carries at the bottom a curved plate $m$, which after the parts have been adjusted in position can be fixed by set-screws $n$. The surfaces of both portions $g\ h$ form in conjunction a tapered cylindrical surface bounded on one side by the oblique flange $i\ j$, as shown in Fig. 4.

From the nave $d$ of the shipper stretches an arm $o$, provided with a pin $p$, which rests in a hook $q$, fixed to the ceiling when the belt is not shipped, Figs. 1 and 2. In this position the belt overhangs the broad end of the segment-surface $g\ h$.

If the belt is to be put on, the pin $p$ of the arm $o$ of the shipper is unhooked by means of a rod $r$ and the arm $o$ pulled down, Fig. 3, thereby causing the shipper to swing round the shaft and its oblique flange $i\ j$ to push the belt laterally onto the pulley.

The division of the segment-surface and the radially-adjustable character of its two parts permits of the same shipper being used for pulleys of varying diameter within the limits afforded by the length of the slots for the set-screws $l$ and $n$.

After the belt has been shipped the pin $p$ of the arm $o$ of the shipper is again put into the hook $q$ on the ceiling, so that when unshipping the belt the latter returns into the normal position, Fig. 1.

What I claim is—

1. In a belt-shipper, the combination, of a segment consisting of two parts joined by radial supporting-arms to a nave, rotatable on the shaft, with an oblique flange arranged on the tapered cylindrical surface of the segment, and means for preventing the nave of the shipper from shifting laterally and means for rotating the shipper on the shaft independently of the belt-pulley, substantially as set forth.

2. In a belt-shipper, the combination of a segment, consisting of two parts, each one having a radial arm, slidable radially in a guiding of radial arms of a nave, rotatable on the shaft, each part of the segment having a part of an oblique flange, arranged on the tapered cylindrical surface produced by the two segment parts, set-screws for adjusting the segment-part arms on the guidings of the nave-arms, a curved plate secured on the under side of one segment part, and set-screws for adjusting said plate on the other segment part, and means for preventing the nave of the shipper from shifting laterally and means for rotating the shipper on the shaft substantially as specified and shown in the drawings.

Signed at Berlin this 23d day of May, 1903.

EMANUEL KOTTUSCH.

Witnesses:
 WOLDEMAR HAUPT,
 HENRY HASPER.